(12) United States Patent
Smith et al.

(10) Patent No.: US 7,416,398 B2
(45) Date of Patent: *Aug. 26, 2008

(54) NEEDLE ASSEMBLY FOR GAS-ASSISTED INJECTION MOULDING

(75) Inventors: Gordon Frederick Smith, Warwick (GB); Rui Magalhaes, Coventry (GB)

(73) Assignee: University of Warwick, Coventry (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/843,882

(22) Filed: May 12, 2004

(65) Prior Publication Data

US 2005/0098929 A1    May 12, 2005

(30) Foreign Application Priority Data

May 13, 2003    (GB)    ................. 0310915.4

(51) Int. Cl.
  *B29C 31/10*    (2006.01)
(52) U.S. Cl. ........................ 425/130; 264/572
(58) Field of Classification Search .............. 425/130; 249/141; 264/572
See application file for complete search history.

(56) References Cited

U.S. PATENT DOCUMENTS

| | | | |
|---|---|---|---|
| 2,331,688 A | 10/1943 | Hobson | |
| 4,150,689 A * | 4/1979 | Britten | ........................ 137/595 |
| 5,908,641 A | 6/1999 | Erikson | |
| 6,000,925 A * | 12/1999 | Daniels | ....................... 425/130 |
| 6,250,903 B1 * | 6/2001 | Fernandez et al. | .......... 425/130 |
| 6,354,826 B1 | 3/2002 | Thomas | |

FOREIGN PATENT DOCUMENTS

| | | |
|---|---|---|
| DE | 1479162 | 2/1969 |
| DE | 3925909 | 2/1991 |
| DE | 4024549 | 2/1992 |
| DE | 4132986 | 4/1993 |
| DE | 4444579 | 6/1996 |
| DE | 19405633 | 8/1996 |
| EP | 576881 | 1/1994 |
| EP | 1070576 | 1/2001 |
| GB | 2350814 | 12/2000 |
| JP | 03274120 | 9/1992 |
| JP | 09 076275 | 7/1997 |
| WO | WO93/23228 | 11/1993 |

* cited by examiner

*Primary Examiner*—Yogendra Gupta
*Assistant Examiner*—Maria Veronica D Ewald
(74) *Attorney, Agent, or Firm*—Wood, Phillips, Katz, Clark & Mortimer (57) ABSTRACT

A fluid injection and exhaust needle for use in gas injection moulding comprising a needle with two separate flow channels; a fluid inlet channel and a fluid outlet channel; wherein gas is injected into the melt via the fluid inlet channel to form a gas cavity in the melt, and gas is simultaneously exhausted from the cavity via the fluid outlet channel.

13 Claims, 6 Drawing Sheets

NEEDLE ASSEMBLY FOR GAS-ASSISTED INJECTION MOULDING

BACKGROUND OF INVENTION

1. Field of the Invention

This invention relates to a needle assembly that allows simultaneous injection and exhaust of fluid for injection moulding, and in particular the injection and exhaust of a gas.

2. Background Art

In conventional gas assisted gas injection moulding methods, a pre-filling of melt material is first introduced into a mould. A gas is then injected within the melt so creating a hollow or void within the melt that exerts pressure throughout the cooling of the melt to compensate for volumetric shrinkage. Typically, a first needle assembly is used to inject gas and when injection is complete gas injection is ceased and gas is exhausted through a second needle assembly; this exhaust occurring after the melt has solidified. Hence, the injection and exhaust steps do not overlap.

SUMMARY OF THE INVENTION

It is an object of the present invention to provide an apparatus and method wherein gas may be injected within the mould component and simultaneously exhausted therefrom using a single needle assembly. It is a further object to provide simpler "high flow" needle with no moving parts, having longer life and being less prone to blockage by solidified polymer. Another object is to provide circulation of gas within the mould during simultaneous injection and exhaust.

According to a first aspect of the invention there is provided a gas injection and exhaust needle assembly for use in injection moulding comprising at least two separate channels; a gas inlet channel and a gas outlet channel and means for allowing the simultaneous entry and exit of gas to the respective channels. This means that only a single needle assembly is required; in contrast to conventional arrangements that normally require two needle assemblies. Naturally, operation and cost advantages stem from the resultant simplification.

Preferably, the fluid outlet channel is the first channel and fluid inlet channel is the second channel and these channels are arranged substantially concentrically along the longitudinal axis of the needle, the first channel surrounding the second channel.

Preferably, the first channel comprises an annulus formed between an outer needle tube and an inner needle tube and the second channel is within the inner needle tube.

Actuating means may be provided to allow axial movement of the inner needle tube relative to the outer needle tube and the said axial movement may be used to actuate a valve that allows or prevents flow of fluid out of the first channel at the needle tip. The actuating means may comprise a piston assembly wherein fluid entering the needle assembly exerts a force upon the piston and thereby provides axial movement of the piston and the inner needle tube. This feature offers the advantage of eliminating the need for motorised means to actuate the assembly.

Biasing means may provide a force that opposes said movement of the piston under the influence of fluid pressure.

A rod may be provided within the inner needle tube with an enlarged head portion near the needle tip. This helps prevent blockage of the needle by solidified melt.

Preferably, fluid flows from a needle assembly fluid inlet through the first channel to the end tip of the needle and then fluid flows from the end tip of the needle through a second channel and through a channel in the actuating means to a needle assembly fluid outlet.

The apparatus of the invention allows gas to be injected into a polymer melt at the initial stage of moulding and then assists in circulation of the gas within the cavity during the cooling and packing stage of the cycle.

According to another aspect the invention provides a needle for simultaneous injection and exhaust of gas during injection moulding comprising an open end which has a flow valve with no moving parts comprising a plurality of individual flow channels sized such that in use gas may freely flow through these channels but liquid moulding material may not freely flow therethrough. The depth/width of a flow channel is preferably between 0.01 and 0.1 mm, and more preferably between 0.01 and 0.05 mm.

The plurality of individual flow channels may be provided by one or more washers. The flow channel is formed on one face or both faces of the washer. A plurality of channels may be provided on or within the member or washer. Preferably, washers are arranged in the form of a stack and held in place by a bolt or the like that passes through a hole in the washer. The washer is frequently circular in outline; however, other shapes may be employed.

The flow channel may also be provided by a helical member formed by spirally winding a strip of material on a former. Spacer elements are provided between each turn of the material so as to form elongate flow channels. While the former used to produce the spiral is preferably generally circular in cross section other shaped formers may be used; for example, a generally square shaped former may be used to produce a "spiral" that has four sides to each turn and is suitable for inserting within a needle that has a generally square shaped inner channel. The spacer elements may be provided by strips attached to one surface of sheet material prior to rolling on a former. Preferably, the spacer strips are generally parallel and they provide a gap of up to 0.1 mm and typically a gap of between 0.01 and 0.05 mm between each turn of the spiral. Strips may also be formed integrally within the sheet material by providing channels (typically 0.03 mm deep); preferably parallel elongate channels formed by grinding or other known means. Thus the strips so formed are those areas of the sheet material without such channels. Preferably the strips are inclined at an angle to the longitudinal axis of the strip; this offers the advantage of helping to avoid collapse of the strip as it is wound. Preferably, the angle of inclination is in the range 10° to 60° and more preferably in the range 10° to 30°; typically approximately 20°. A series of concentric rings with annular flow channels therebetween may be used instead of the spiral coil arrangement described above. Less preferably, the flow restrictor may comprise a matrix of channels having a polygonal cross section formed by sets of parallel sheets or wires each set being inclined at an acute angle to the other set.

In another aspect the invention comprises a method of gas injection moulding where melt is injected into a mould and gas is injected into the melt via a gas injection needle to form a gas cavity in the melt, wherein the needle also provides a channel for simultaneous exhaust of gas from the cavity. This offers further advantages over conventional methods since circulation of the gas enhances cooling of the melt and thereby increases productivity of a manufacturing facility.

BRIEF DESCRIPTION OF DRAWINGS

Fluid injection and exhaust assemblies will now be described by way of example only, with reference to the following schematic drawings in which.

DETAILED DESCRIPTION OF THE INVENTION

Figure 1:
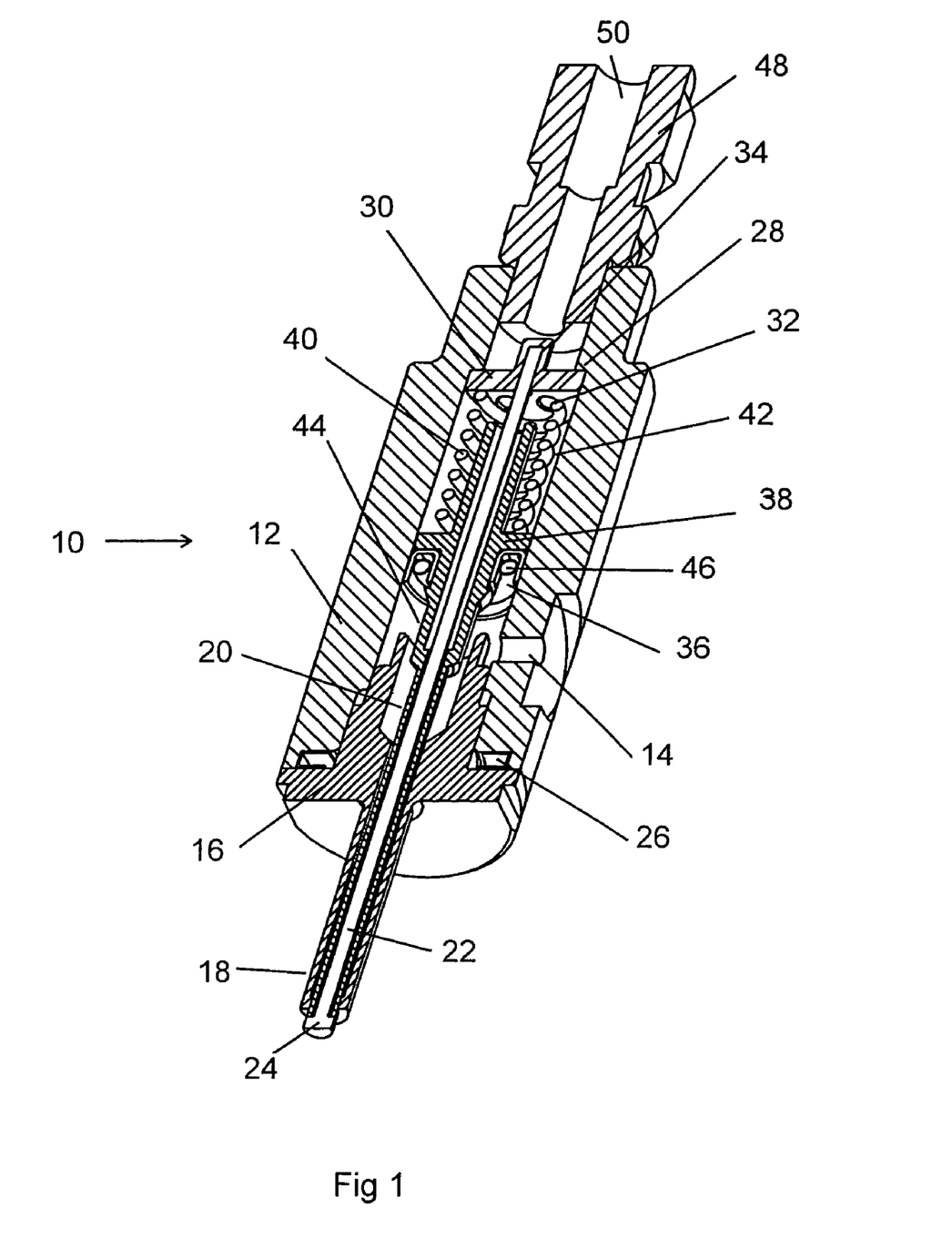
FIG. 1 is a sectioned perspective view of a needle assembly according to a first embodiment of the invention.
Figure 2:
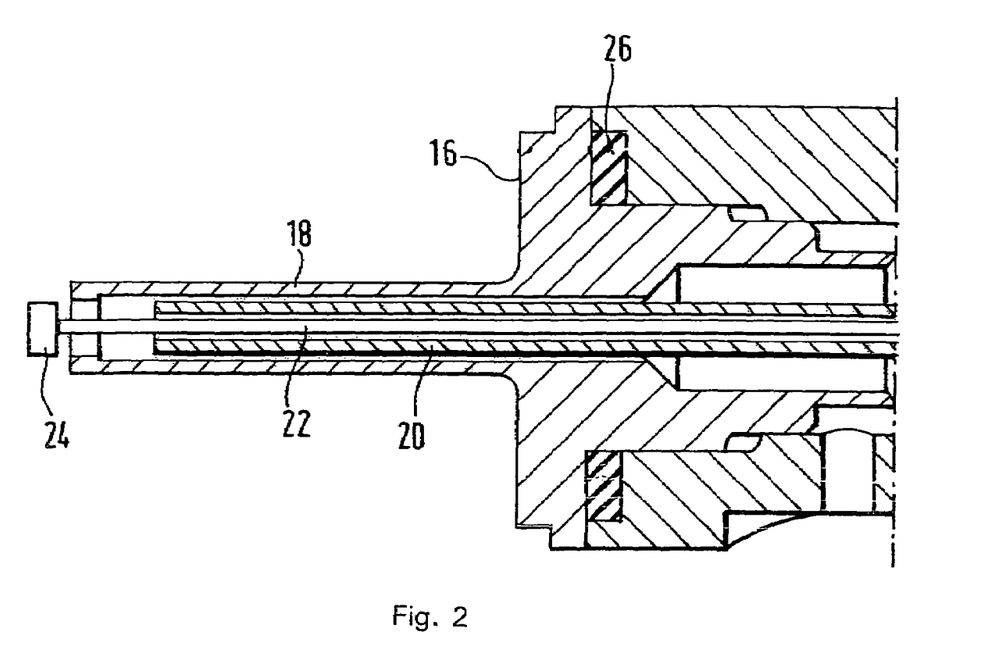
FIG. 2 is an enlarged scale view of part of the needle assembly of FIG. 1.

Referring to a first embodiment of the invention, illustrated in FIG. 1; a fluid injection and exhaust needle assembly 10 having a mechanical flow valve; comprises a main body 12 that is generally of tubular construction having a female screw thread at either end and a fluid inlet port 14 located in the side of the main body 12 towards the lower end. The purpose of the inlet port 14 is to allow liquid or gas to be supplied under pressure to the needle assembly. A needle base flange member 16 has a threaded portion adapted to engage the female screw thread of the main body. A needle comprises an outer tube 18 attached to the needle base flange member 16 with an inner tube 20 located concentrically therein, that in use moves axially relative to the outer tube 18 (see below). Within the inner tube 20 is located an elongate rod 22 with an enlarged end tip 24 that is located proximal the tip of outer tube 18. A sealing ring 26 made of resilient material is located between main body 12 and needle base flange 16.

An abutment disc 30 is located inside the upper end of main body 12 and has flow channels 32 comprising four circular apertures and rod retaining cavity 34. A piston assembly 36 comprises piston sleeve 40, piston disc 38 and piston head 44. The piston head has an annular shaped seal member 46 to prevent leakage of fluid between the piston wall and the inner wall of the tubular body 12. The piston assembly is slideably mounted on rod 22 so that is may slide between disc 30 towards needle base flange 16, towards which it is biased by means of a helical compression spring 42. Spring 42 is located around piston sleeve 40 and the ends of the spring abut the lower surface of disc 30 and the upper surface of piston disc 38.

A fluid outlet fitting 48 has a male thread at one end adapted to engage the female thread at the upper end of main body 12. The outlet fitting is of a generally tubular construction having a central flow channel 50. A shut-off valve (not shown) may be located downstream of fluid outlet channel 50 to control pressurisation of fluid within the assembly 10. Thus, when the valve is opened fluid is vented to atmosphere and the fluid pressure decreases.

Figure 3:
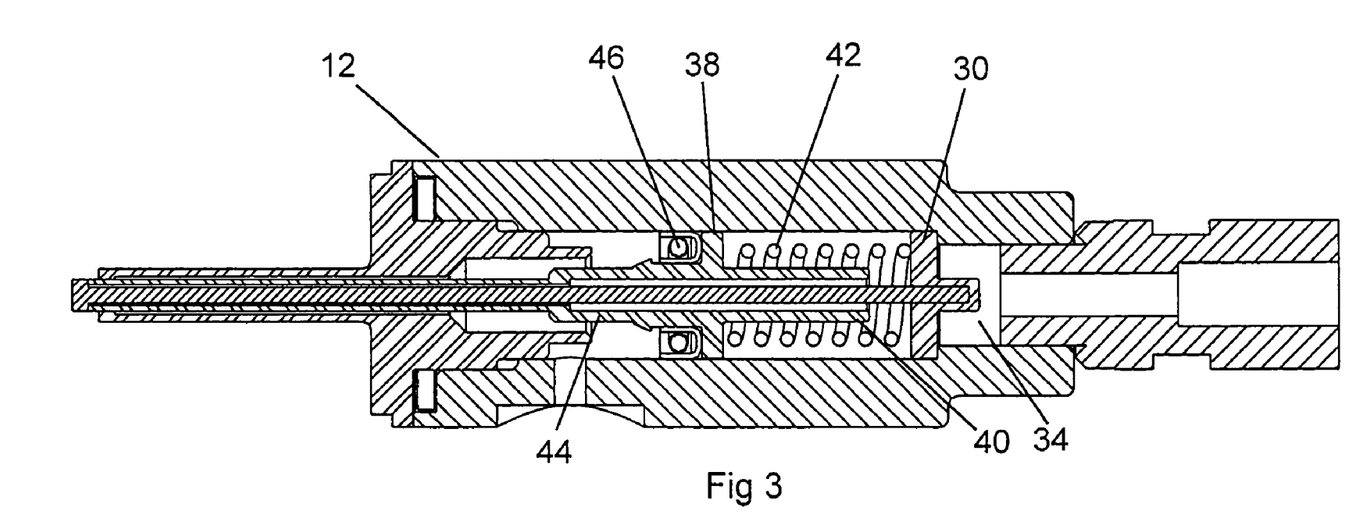
FIG. 3 is a sectioned side elevation of the needle assembly of FIG. 1 with the needle in a closed position.
Figure 4:
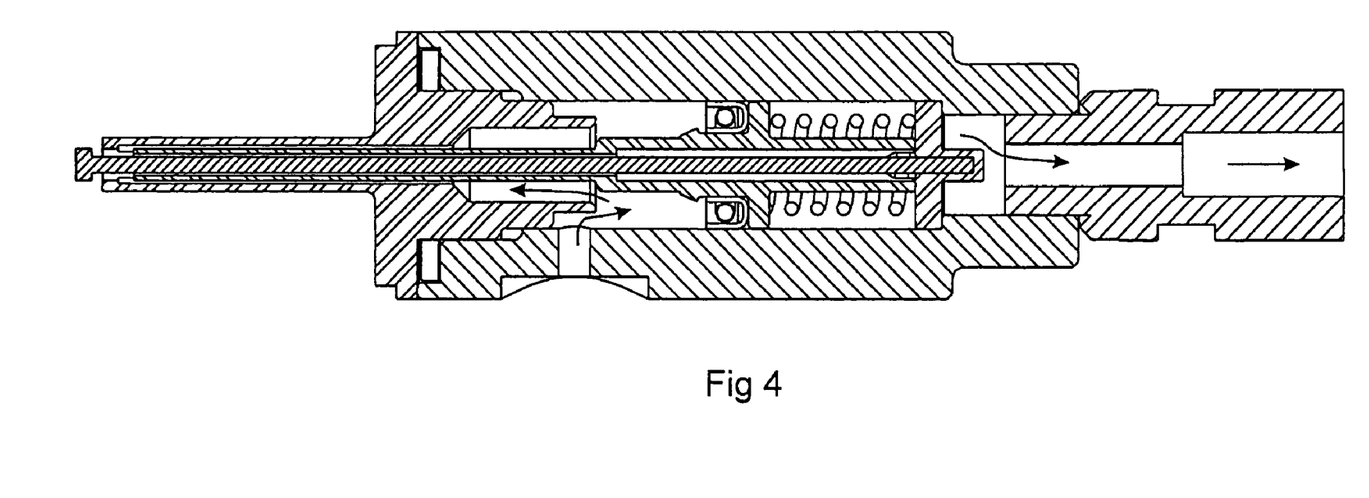
FIG. 4 is a sectioned side elevation of the needle assembly of FIG. 1 with the needle in an open position.

Operation of the needle assembly will now be described by reference to FIGS. 2 to 5. FIG. 3 shows the assembly in the closed position. Thus, the lower end of needle inner tube 20 abuts against an inside rebate of outer tube 18 (see FIG. 5a) thereby preventing flow of fluid out of the needle. When fluid is supplied under pressure to the needle assembly via inlet port 14 it exerts a force upon the lower face of piston disc 38 that tends to slide the piston assembly on rod 22 towards the upper end of the main body 12; this movement continues until the force so exerted is balanced by the axial force exerted by spring 42 under compression. As piston assembly 36 moves the inner tube 20, which is fixed at the upper end to the lower end of piston head 44, moves upwardly allowing fluid to pass out of the needle (see FIG. 5b). Thus, fluid flows through inlet 14 into the main body 12 and then through an annulus, formed between the inner tube 20 and a central bore in needle base flange 16, into an annular channel formed between inner tube 20 and outer tube 18. When the needle assembly is in this open position fluid may also flow from the melt void into the needle tip initially through the annulus formed between rod 22 and the inner tube 20, and then through the annulus formed between the rod 22 and the piston sleeve 40, finally passing out of the needle assembly through flow channels 32 to the fluid outlet channel 50.

During introduction of melt to the mould it is important that the inner lower end of tube 18 abuts against either a rebate within outer tube 18 or the rod tip 24 in order to prevent ingress of melt material within the needle assembly 10.

Figure 5:
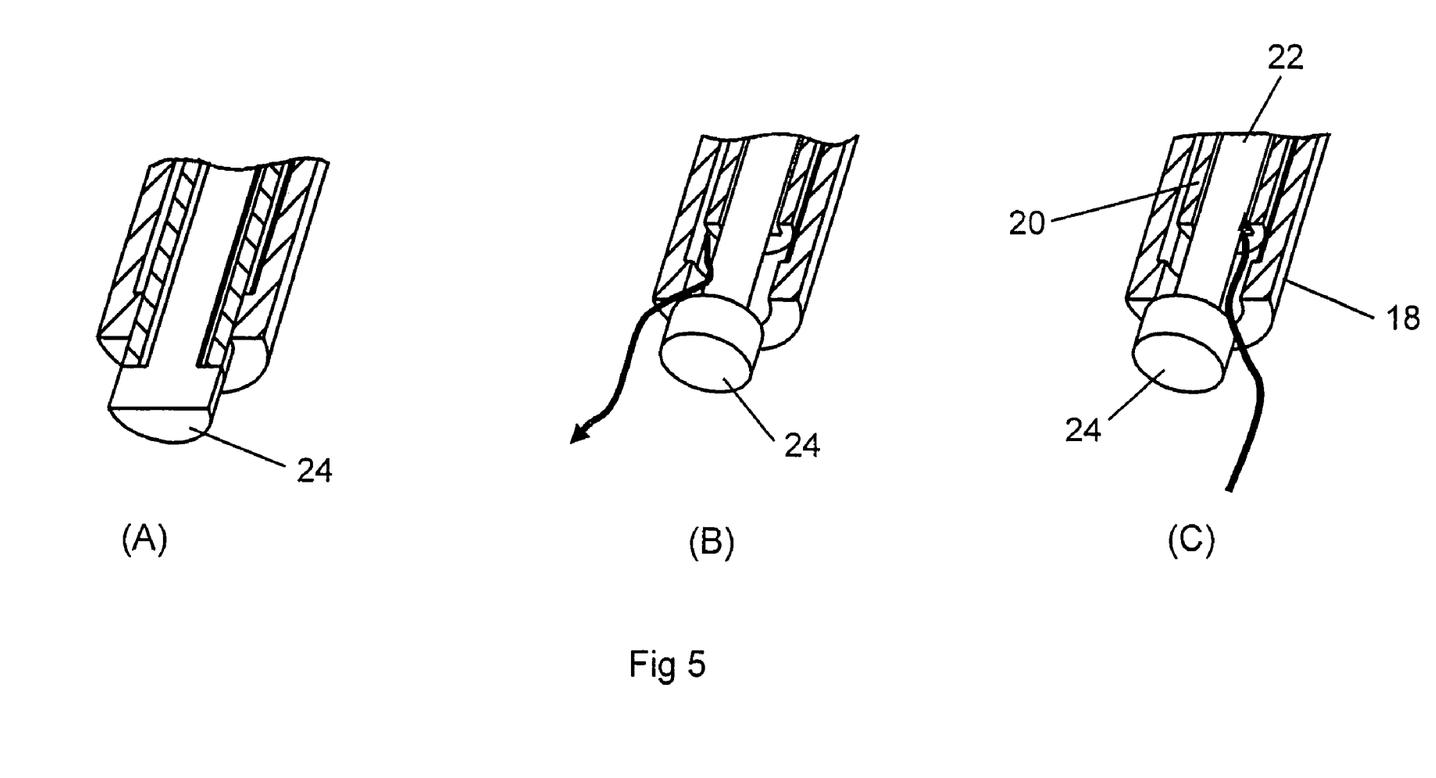
FIG. 5 shows enlarged views of the needle tip of the needle assembly of FIG. 1 in closed and open positions.

When the needle assembly is in an open position (see FIGS. 3, 5b and 5c) fluid may be injected within the melt. The fluid is preferably a gas such as nitrogen. The gas may be chilled to enhance cooling of the melt. It is preferable to use very cold gas; such as gas available from vaporisation of liquid gas; for example, liquid nitrogen. The gas may be circulated within the gas void formed within the melt during the moulding process. The needle assembly of the invention advantageously allows circulation of injected gas prior to exhaust of this gas via the inner tube 20 of the needle. The needle is designed so that fluid may be simultaneously injected into the melt void and vented; hence the injection and venting stages may overlap; control is provided by an exhaust shut-off valve (not shown). Alternatively, water may be injected within the mould to achieve the required moulding and cooling effect.

Figure 6:
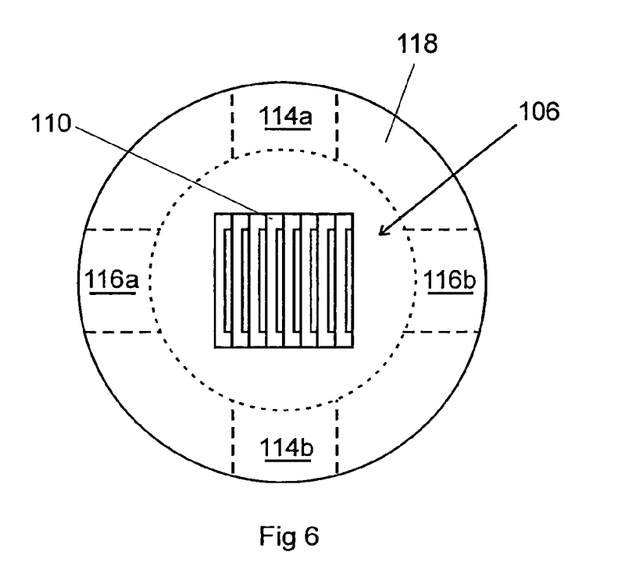
FIGS. 6 and 7 show an end view and a sectioned side view of a needle assembly according to a second embodiment of the invention.
Figure 7:
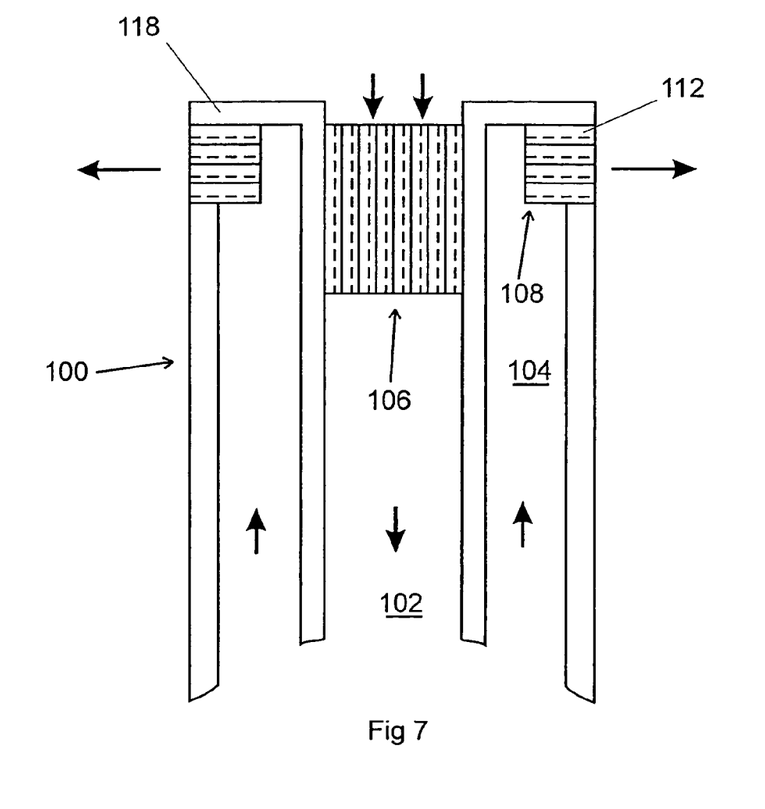

A second embodiment of the invention is illustrated in FIGS. 6 and 7. This embodiment avoids the need for the mechanical valve of the first embodiment, provided by the piston assembly 36 and associated parts, by utilising flow restrictors. FIG. 6 shows a sectioned side view of the end portion of a needle assembly 100 comprising an inner flow channel 102 and a surrounding annular flow channel 104. A first flow restrictor 106 is provided at the end of inner flow channel 102 and a second flow restrictor 108 is provided at the end of annular flow channel 104. Flow restrictors 106 and 108 present a plurality of individual flow channels sized such that in use gas may freely flow through these channels but liquid moulding material may not freely flow therethrough. This is achieved by selection of appropriate dimensions for each flow channel.

First flow restrictor 106 comprises a stack of sheet members 110; each sheet member having a generally "U-shaped cross section (see FIG. 6). Individual sheet members 110 may be produced by cutting a single long sheet. The thickness of each sheet member 110 is about 0.1 mm and the depth/width d of each flow channel formed by stacking the U-shaped members is preferably within the range 0.02 to 0.05 mm.

Second flow restrictor 108 comprises a stack of washers 112. Each washer 112 has a slot or channel that extends diametrically across one face of the washer part way therethrough. The slots comprise a pair of North-South diametric slots 114a and 114b and a pair of East-West diametric slots 116a and 116b. The depth of these slots is preferably within the range 0.02 to 0.05 mm. Each washer has a centrally located hole sufficiently large to surround the inner flow channel and so form an annulus between this channel and the washer hole that in use provides a passageway that allows gas to flow out of the needle. Alternatively, flow restrictor 108 may be provided using washers that have a slot or channel on both sides of the washer. In this case these washers are separated from each other in the stack by similar sized standard washers that have no such slots or channels.

The number and location of slots may vary according to the size of the washer and other factors. In addition, such a configuration of slots can be used with both the single sided slot washer 112 and the twin sided slot washer. It should be noted that while the washer will frequently be circular in outline that other shapes are possible such as square, rectangular, polygonal etc., in which case the hole need not be centrally located.

Inner flow channel 102 has an end flange 118. Flange 118 co-operates with the end of annular flow channel 104 to hold flow restrictor 108 in place. Inner flow channel 102 has four inner walls dimensioned such that the rectangular shaped flow restrictor 108 closely fits therein and is held in place by adhesive or equivalent means.

In use, during injection moulding, high pressure gas flows along annular flow channel 104 and exits radially through flow restrictor 108 into the mould cavity. Gas from the moult cavity returns by flowing axially through inner flow channel 102, via flow restrictor 104. Surprisingly, while the dimensions of the flow restrictor flow channels allow flow of gas therethrough it has been found that they do not allow the flow of injection moulding materials. Therefore the flow restrictors act as a valves; allowing gas flow but preventing liquid flow. This offers advantages over known devices that rely on mechanical valve arrangements that are more complex and subject to both wear and blockage. Alternatively, gas may enter the mould cavity via inner flow channel 102 and return via annular flow channel 104.

Figure 8:
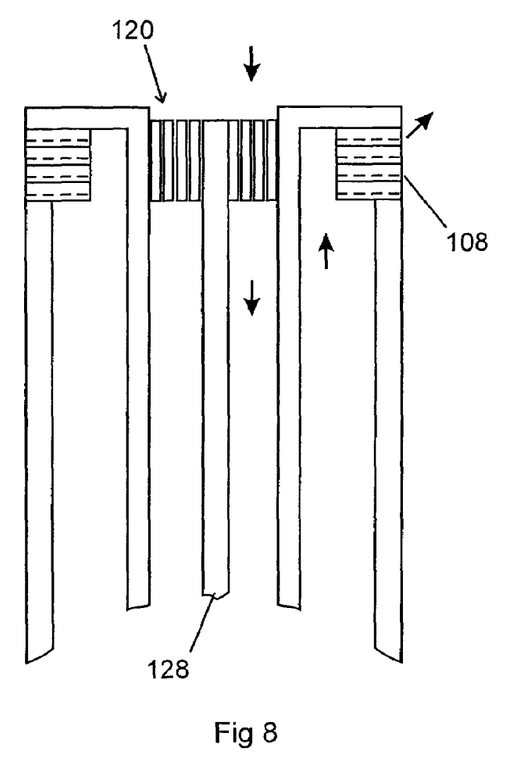
FIG. 8 shows a side view of a needle assembly according to a third embodiment of the invention.
Figure 9:
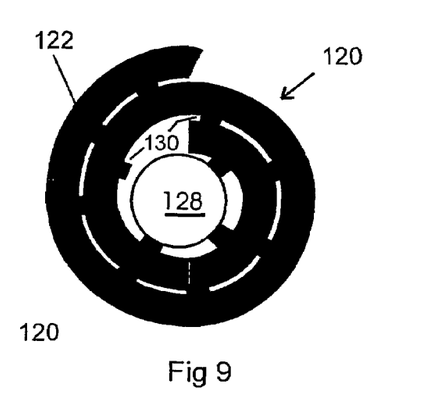
FIGS. 9 and 10 show how the spiral flow restrictor of FIG. 8 can be produced by cutting sheet material and winding on a former.
Figure 10:
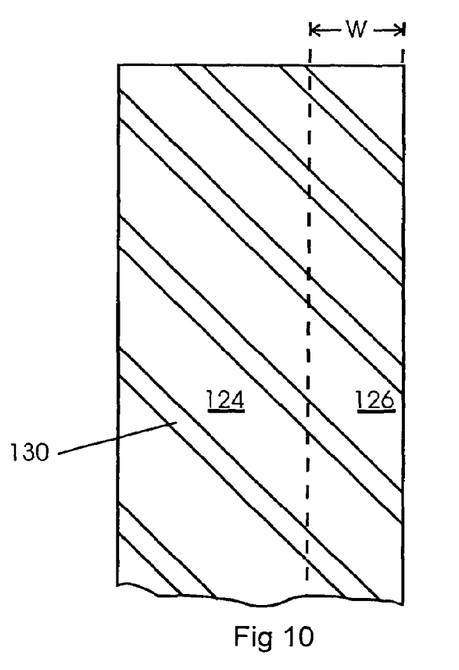

A third embodiment of the invention is illustrated in FIG. 8. This arrangement is similar to that described above for the second embodiment apart from the flow restrictor 120 located in the inner flow channel. This embodiment of the invention employs a spiral member 122 to provide the plurality of individual flow channels. Spiral member 122 may be formed (see FIGS. 9 and 10) from sheet material 124 cut to appropriate width W to form material strip 126; the strip 126 then being coiled around a former 128; for example, in the same way that a watch spring is formed. Flow channels are ensured by providing spacer elements. This may conveniently be provided by forming a series of parallel spacer strips 130 on the sheet material. The spacer strips 130 may be formed on the sheet material by the electro-discharge machining method. The parallel strips 130 are inclined at an angle a of about 45° to the longitudinal axis of the strip of material 124. FIG. 9 shows an end view of part of the spiral member 122 showing how spacer strips 130 of generally rectangular cross section provide a plurality of arcuate slots 132 that present flow channels of the required dimension. The spacers 130 are normally less than 0.1 mm. thickness and preferably about 0.03 mm. thickness. Spiral member 122 is held in place at the open end of the needle by means of a retaining rod 128. Rod 128 may also be used as the former upon which strip 130 is wound in the manufacture of the spiral.

Again, in use high pressure gas flows along the annular flow channel and exits radially through flow restrictor 108 into the mould cavity. Gas from the moult cavity returns by flowing axially through the inner flow channel, via flow restrictor 120. Alternatively, gas may enter the mould cavity via inner flow channel and return via annular flow channel.

In use, gas flows through the flow channels at high pressure; typically at up to 50 to 300 bar. The number of washers that are stacked will determine the flow obtained for a given pressure differential between the needle and the moulding material void.

We claim:

1. A gas injection and exhaust needle assembly for injecting a gas into a liquid melt during gas injection moulding comprising at least a gas inlet channel and a separate gas outlet channel and means for allowing the simultaneous entry and exit of gas to the respective channels,
    wherein at least one of said channels comprises a flow restrictor sized such that in use gas may freely flow through the channel but liquid moulding material may not freely flow therethrough,
    wherein the flow restrictor further comprises a strip of material spirally wound on a flat plane to produce a spiral with adjacent turns with spacer elements provided between adjacent turns of the spiral.

2. An assembly according to claim 1 wherein the flow restrictor comprises a plurality of individual flow channels.

3. An assembly according to claim 1 wherein the gas injection and exhaust needle assembly has a longitudinal axis and the gas inlet and gas outlet channels are arranged substantially parallel to the longitudinal axis.

4. An assembly according to claim 1 wherein the gas inlet/gas outlet channel surrounds the gas outlet/gas inlet channel respectively.

5. An assembly according to claim 1 wherein an outlet of the gas outlet channel comprises a member that constricts gas flow and has an outlet aperture located at a peripheral point on the member.

6. An assembly according to claim 1 wherein the spacer elements provide a gap of between 0.01 and 0.05 mm between adjacent turns of the spiral.

7. An assembly according to claim 1 wherein the spiral comprises metal and the spacer elements are formed on a surface of the spiral by an electro-discharge machining method or chemical etching or mechanical grinding/pressing.

8. An assembly according to claim 1 wherein the spacer elements comprise a series of parallel strips inclined at an angle a to an edge of the strip where a is in the range 10° to 60°.

9. A gas injection and exhaust needle assembly according to claim 1 in combination with a supply of gas to be directed into and through the gas inlet channel and gas outlet channel and a mould with a melt therein into which gas from the supply can be injected and from which gas from the supply can be exhausted through the gas injection and exhaust needle assembly.

10. A method of gas injection moulding comprising the steps of:
    providing a gas injection and exhaust needle assembly comprising at least a gas inlet channel and a separate gas outlet channel with a flow restrictor in one of the gas inlet and gas outlet channels that: a) is sized such that in use gas may freely flow through the one channel but liquid moulding material may not flow freely therethrough; and b) comprises a strip of material spirally wound on a flat plane with adjacent turns between which spacer elements are provided;
    providing a mould with a melt therein; and
    directing a gas into the gas inlet channel and therefrom into the melt in the mould and from the melt to and through the gas outlet channel.

11. The method of gas injection moulding according to claim 10 wherein the step of providing a gas injection and exhaust needle assembly comprises providing a gas injection and exhaust needle assembly wherein the spacer elements maintain a gap of between 0.01 and 0.05 mm between adjacent turns.

12. The method of gas injection moulding according to claim 11 wherein the step of providing a gas injection and exhaust needle assembly comprises providing a gas injection and exhaust needle assembly wherein the strip of material comprises metal and the spacer elements are formed on surfaces of the strip of material by at least one of: a) an electra-discharge machining method; b) chemical etching; and c) mechanical grinding/pressing.

13. The method of gas injection moulding according to claim 10 wherein the step of providing a gas injection and exhaust needle assembly comprises providing a gas injection and exhaust needle assembly wherein the spacer elements comprise a plurality of parallel strips inclined at an angle a to an edge of the strip, where a is in the range of 10° to 60°.

* * * * *